US011586256B2

(12) United States Patent
Bermudez Rodriguez et al.

(10) Patent No.: US 11,586,256 B2
(45) Date of Patent: *Feb. 21, 2023

(54) SERVER RACK FOR IMPROVED DATA CENTER MANAGEMENT

(71) Applicant: INTERNATIONAL BUSINESS MACHINES CORPORATION, Armonk, NY (US)

(72) Inventors: Sergio A. Bermudez Rodriguez, Croton-On-Hudson, NY (US); Hendrik F. Hamann, Yorktown Heights, NY (US); Hans-Dieter Wehle, Horb Talheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/706,885

(22) Filed: Sep. 18, 2017

(65) Prior Publication Data
US 2018/0024598 A1 Jan. 25, 2018

Related U.S. Application Data

(63) Continuation of application No. 13/791,026, filed on Mar. 8, 2013, now Pat. No. 9,864,417.

(51) Int. Cl.
*G06F 1/18* (2006.01)
*G06Q 10/087* (2023.01)
(Continued)

(52) U.S. Cl.
CPC ............... *G06F 1/18* (2013.01); *G06F 1/206* (2013.01); *G06F 1/28* (2013.01); *G06F 1/3206* (2013.01);
(Continued)

(58) Field of Classification Search
CPC ... G06F 1/18; G06F 1/206; G06F 1/28; G06F 1/3206; G06Q 30/0635; G06Q 30/06; G06Q 10/10; G06Q 10/087; G06Q 10/083
(Continued)

(56) References Cited

U.S. PATENT DOCUMENTS 7,130,719 B2 10/2006 Ehlers et al.
7,739,073 B2 6/2010 Hamann et al.
(Continued)

OTHER PUBLICATIONS

Nourbakhsh, Ehsan. Wireless sensor networks for monitoring smart grids: Design and experimental verification. The University of Texas at Dallas. ProQuest Dissertations Publishing, 2013. (Year: 2013).*

(Continued)

*Primary Examiner* — Nathan C Uber
*Assistant Examiner* — Fawaad Haider
(74) *Attorney, Agent, or Firm* — Tutunjian & Bitetto, P.C.; Erik Johnson

(57) ABSTRACT

Methods and systems for data center management include collecting sensor data from one or more sensors in a rack; determining a location and identifying information for each asset in the rack using a set of asset tags associated with respective assets; communicating the sensor and asset location to a communication module; receiving an instruction from the communication module; and executing the received instruction to change a property of the rack.

20 Claims, 4 Drawing Sheets

(51) Int. Cl.
G06Q 10/083 (2023.01)
G06Q 10/10 (2023.01)
G06Q 30/0601 (2023.01)
G06Q 30/06 (2023.01)
G06F 1/20 (2006.01)
G06F 1/28 (2006.01)
G06F 1/3206 (2019.01)

(52) U.S. Cl.
CPC ......... *G06Q 10/083* (2013.01); *G06Q 10/087* (2013.01); *G06Q 10/10* (2013.01); *G06Q 30/06* (2013.01); *G06Q 30/0635* (2013.01); *Y02D 10/00* (2018.01)

(58) Field of Classification Search
USPC ........................................................... 705/28
See application file for complete search history.

(56) References Cited

U.S. PATENT DOCUMENTS

| | | | | |
|---|---|---|---|---|
| 7,894,944 | B2* | 2/2011 | Liu | H04L 67/12 700/276 |
| 7,933,739 | B2 | 4/2011 | Brey et al. | |
| 8,160,838 | B2 | 4/2012 | Ramin et al. | |
| 8,674,822 | B2* | 3/2014 | Priyantha | G06Q 10/087 340/505 |
| 2003/0046339 | A1* | 3/2003 | Ip | H04L 41/12 709/203 |
| 2004/0090329 | A1 | 5/2004 | Hitt | |
| 2006/0206235 | A1* | 9/2006 | Shakes | B65G 1/1373 700/216 |
| 2007/0222597 | A1* | 9/2007 | Tourrilhes | G06Q 10/06 340/572.1 |
| 2011/0215946 | A1* | 9/2011 | Aguren | G08C 19/00 340/870.3 |
| 2011/0298607 | A1* | 12/2011 | Priyantha | G06Q 10/087 340/505 |
| 2012/0109404 | A1 | 5/2012 | Pandey et al. | |

OTHER PUBLICATIONS

Abdelmaksoud, Waleed A. Experimental and Numerical Investigations of the Thermal Environment in Air-cooled Data Centers. Syracuse University, ProQuest Dissertations Publishing, 2012. (Year: 2012).*

Chen, J., et al. "A High-Fidelity Temperature Distribution Forecasting System for Data CENlERS" The 33rd IEEE Real-Time Systems Symposium (RTSS 2012). Dec. 2012. (10 Pages).

Choochaisri, S., et al. "SENVM: Server Environment Monitoring and Controlling System for a Small Data Center Using Wireless Sensor Network" The 1st International Computer Science and Engineering Conference (ICSEC 2010). 2010. pp. 23-28.

Hamann, H., et al. "Recovery Act: A Measurement-Management Technology for Improving Energy Efficiency in Data Centers and Telecommunication Facilities" Final technical Report—Award No. DE-EE0002897. Jun. 2012. pp. 1-27.

Liu, J., et al. "Project Genome: Wireless Sensor Network for Data Center Cooling" The Architecture Journal #18, vol. 18. Dec. 2008. pp. 28-34.

List of IBM Patents or Patent Applications Treated as Related dated Sep. 18, 2017, 2 pages.

Liang, Chieh-Jan Mike, "Interference characterization and mitigation in large-scale wireless sensor networks," The Johns Hopkins University, Jan. 2011, 165 pages.

U.S. Office Action issued in U.S. Appl. No. 15/706,893 dated Dec. 9, 2021, 18 pages.

Gupchup, Jayant, "Data management in environmental monitoring sensor networks," The Johns Hopkins University, Feb. 2012, 181 pages.

U.S. Office Action issued in U.S. Appl. No. 15/706,893 dated Mar. 29, 2022, 8 pages.

* cited by examiner

SERVER RACK FOR IMPROVED DATA CENTER MANAGEMENT

STATEMENT OF GOVERNMENT RIGHTS

This invention was made with Government support under Contract No.: DE-EE0002897 awarded by Department of Energy. The Government has certain rights in this invention.

BACKGROUND

Technical Field

The present invention relates to data center management and, more particularly, to integrated housing, sensing, and control devices to integrate and streamline broad management tasks.

Description of the Related Art

Data center operators find it useful to track certain information regarding their spaces. For example, quantities such as temperature and power consumption provide convenient and intuitive metrics for the operating conditions of the data center. As data centers grow and become harder to manage, obtaining fine-grained feedback becomes exponentially more difficult. Temperatures can vary significantly across a large data center, with devices that have a higher workload generating more heat. Meanwhile, power consumption information for individual clients can be helpful in identifying clients with high needs. To obtain this fine-grained information, many sensors are employed and distributed throughout the data center.

A further factor that data centers are concerned with is asset management. Maintaining a large data center involves keeping track of many individual pieces of equipment. It is difficult to keep a listing of such devices up to date, as equipment may be added and removed frequently, or even simply moved from one location to another. As an example, if a particular server is taken down for repair, this fact should be recorded. To accomplish this, data centers use asset management tags and then collate that information into an up-to-date database.

However, these different systems are all maintained separately and use separate infrastructure. The result of this is a large duplication of effort, as separate devices and communication lines are installed for every kind of sensor. Furthermore, maintaining separate infrastructures for each type of sensing complicates the physical organization of the data center, as the presence of additional cables provides additional possible points of failure.

SUMMARY

A data center management system includes a control module configured to monitor a status of a data center; and a plurality of racks, each having one or more assets and a communication mote integrated with the rack that is configured to collect sensor and asset location data and to transmit said collected data to the control module. Each integrated communication module includes a sensor module configured to monitor one or more environmental variables at the respective rack; an asset module configured to determine a location and identifying information for each asset in the rack; and a communication module configured to communicate said sensor and asset location data.

A rack includes one or more assets, each having an associated asset tag; one or more sensors configured to collect environmental data at the rack; and an integrated communication mote. The integrated communication mote includes a sensor module configured to collect sensor data from the one or more sensors; an asset module configured to determine a location and identifying information for each asset in the rack using the assets' associated asset tags; and a communication module configured to communicate said sensor and asset location data to a control module.

A method for data center management includes collecting sensor data from one or more sensors in a rack; determining a location and identifying information for each of a plurality of assets in the rack using a set of asset tags associated with respective assets; communicating said sensor and asset location to a communication module; receiving an instruction from the communication module; and executing the received instruction to change a property of the rack.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide tools for data center management that integrate an array of different information gathering sensors in a cost-effective way that imposes a minimal burden on data center operators. A single infrastructure is provided that collects information from various sensors and communicates that information to a central monitoring station.

Figure 1:
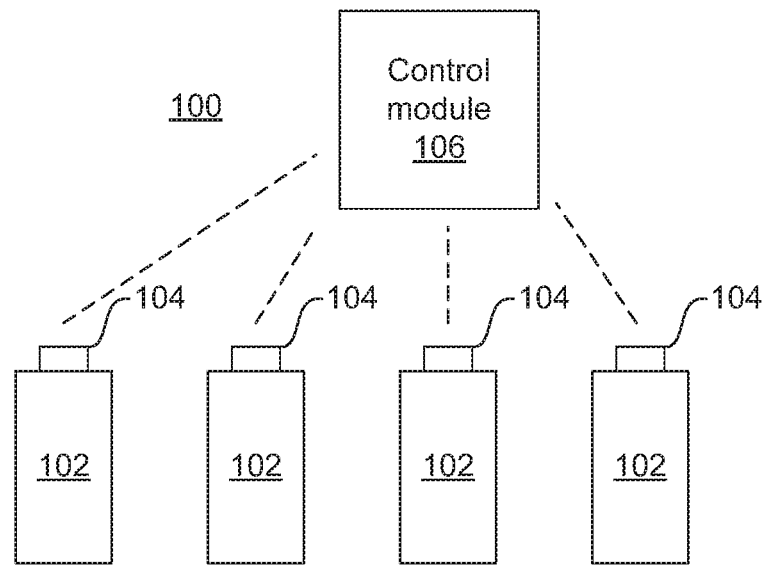
FIG. 1 is a diagram of a managed data center in accordance with the present principles.

Referring now to the drawings in which like numerals represent the same or similar elements and initially to FIG. 1, a data center monitoring system 100 is shown. A set of server racks 102 each have a low-power mote 104 that collects sensor data. The low-power mote 104 may include, e.g., temperature sensors, power consumption sensors, and asset location or tracking sensors. The mote 104 may be integrated with the rack, such that the sensors need not be installed by the data center operator.

The mote 104 collects the data from the disparate sensor types and communicates the data to a control module 106. The mote 104 may communicate this information my any appropriate medium, but it is specifically contemplated that the mote 104 will have a transceiver that is able to communicate with the control module 106 wirelessly. The control module 106 locates, tracks, stores, and displays data from all of the racks 102 and can furthermore take action based on the collected information. For example, if the temperature increases to too high a level, the control module 106 can increase power to a cooling unit.

The control module 106 can furthermore store data and provide analysis on the stored information. This allows the control module 106 to maintain, for example, a database of assets and their present locations, such that any given piece of equipment may be located instantly. If a piece of equipment is removed without proper authority or during a time when it can be reasonably expected that no repairs are being performed, the control module 106 may generate an alarm to alert operators of a potential theft. This stored data can also be used to locate potential areas in the data center that could use preventative maintenance. For example, if the temperature of a single rack increases out of proportion to the power consumption, there may be an air flow problem or damaged fan unit.

Figure 2:
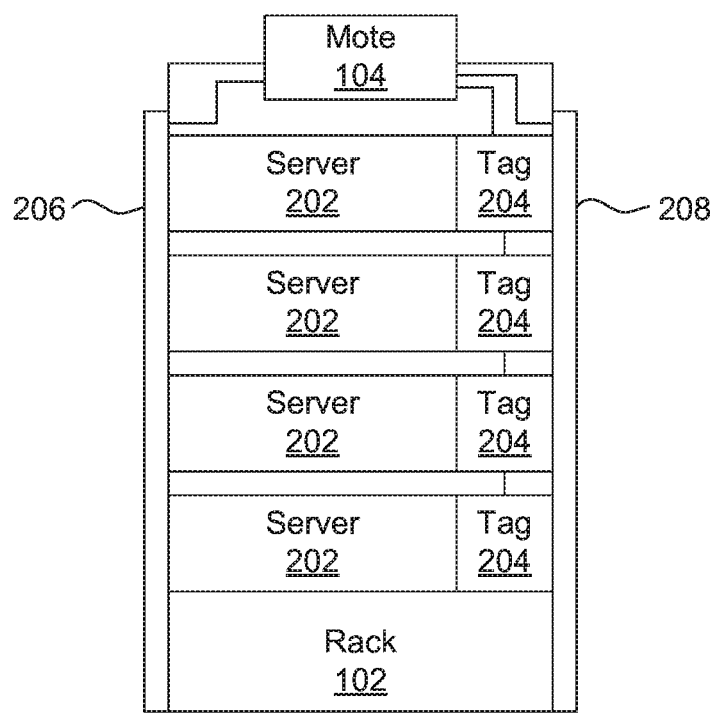
FIG. 2 is a diagram of a managed rack with an integrated communication mote in accordance with the present principles.

Referring now to FIG. 2, a diagram of the rack 102 is shown. A rack 102 includes several assets 202. Generally these assets 202 will be servers that provide services to the client(s) of the data center, but they may represent any kind of device. Each asset 202 has an associated asset tag 204. In one exemplary embodiment, the asset tags 204 are radio frequency identification (RFID) tags that are configured to emit an identifying transmission in response to a wireless query by mote 104. In an alternative embodiment, the tags 204 are each physically connected to the mote 104. Regardless of the medium of communication, the mote 104 receives, e.g., an ID number from each tag 204 and can provide a list of such numbers back to control module 106. The asset tags 204 may optionally include a visual or audio indicator that may be remotely activated, allowing an operator to quickly identify a desired asset 202. It is specifically contemplated that the asset tags 204 will be made unremovable to prevent accidental loss of the tag 204 and, subsequently, the asset 202.

The rack 102 also has one or more sensors. In the present embodiment a temperature sensor 206 and a power draw sensor 208 are shown, but it should be understood that the sensors may also include sensors for light intensity, pressure, air flow, vibrations, acceleration, pollutants, as well as audio and video. The present principles may even be extended to off-rack contexts, where the sensors may include transducers for health monitoring (e.g., blood pressure) or for tracking and surveillance. A temperature sensor 206 may include a series of individual temperature sensors connected to, e.g., an inter-integrated circuit bus or a one-wire communication bus. A further example of a sensor is a passive infrared sensor, which allows the mote 104 to detect when someone is working on the rack for security purposes or for logging. The power sensor 208 may include a series of individual power sensors, one for each asset 202, that monitor the amount of power drawn by the respective asset 202. The power sensor 208 may include Hall sensors that measure current and may further include a voltage sensor. Information from the power sensor 208 may be used to, for example, limit the power consumption of an asset 202 by controlling an intelligent power distribution unit. The power sensor 208 may measure, e.g., current intensity, voltage level, an angular phase difference between the two, individual signal phases in three-phase electric power, etc. This information can be used to calculate power-related metrics such as real and reactive power, complex and apparent power, and a power factor.

The temperature sensor 206 and power sensor 208 are each connected to the mote 104 by an appropriate communication medium and protocol. The mote 104 collects information from all sensors in the rack 102 as well as identification information from asset tags 204. The mote 104 collects the information into a single messaging protocol to communicate with the control module 106, providing information regarding the overall operational status of the rack 102.

Figure 3:
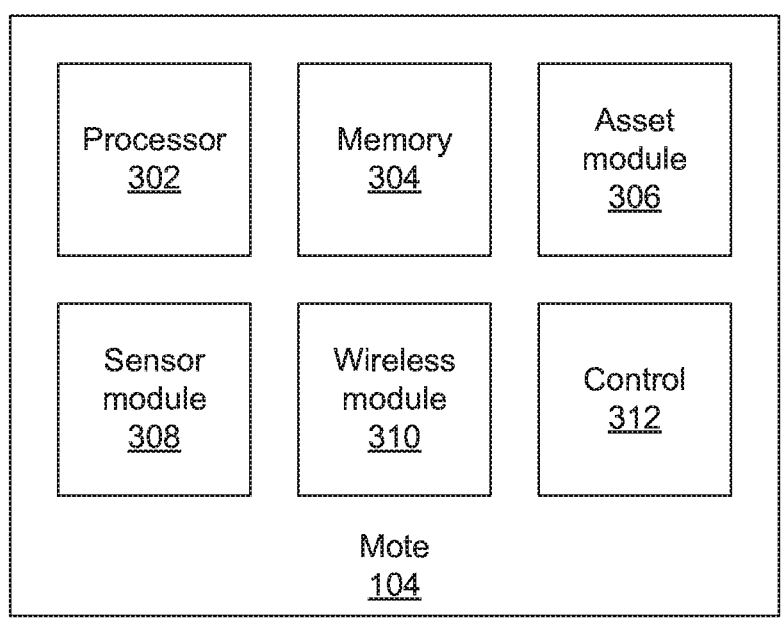
FIG. 3 is a diagram of a communication mote in accordance with the present principles.

Referring now to FIG. 3, a diagram of an individual mote 104 is shown. The mote 104 includes a processor 302 and memory 304. An asset module 306 communicates with asset tags 204 to identify assets within the mote's rack. Asset module 306 may comprise an RFID reader. The asset module 306 may emit a radio pulse configured to prompt asset tags 204 to respond with an identifier, or the asset module 306 may passively receive periodic identification broadcasts from the tags 204. Alternatively, the asset module 306 may be physically connected to the asset tags 204 and communicate with said tags 204 via any appropriate communication medium. Such a medium may be in the form of an asset string that connects to each asset tag 204. The asset module 306 automatically detects any configuration change within the rack 102, such as the addition or removal of assets 202.

The mote 104 can provide two-dimensional and three-dimensional location information for an asset 202 in a data center. A two-dimensional position may be determined for the mote 104 itself, providing its position within the data center 100. This two-dimensional location (x,y) can be determined using features of the mote's radio, where received signal strength, time of flight, and time synchronization may be used to triangulate the mote's position relative to "anchor" motes having known positions. The vertical positioning coordinate z may be determined using wired asset tags 204, where the position of the asset tag 204 corresponds to the position of the associated asset 202 in the rack 102.

The mote 104 includes one or more sensor modules 308, each configured to receive information from one or more sensors. Processor 302 assembles the information collected by sensor module 308 in memory 304. A wireless module 310 communicates with control module 106 to convey asset identification information and sensor information. The wireless module 310 may also communicate with the wireless modules 310 of other motes 104 in other racks 102. This allows the formation of a mesh network. The wireless module 310 may include a low-power wireless transmitter, for example using a wireless protocol such as WirelessHART®, ZigBee®, Bluetooth®, 6LoWPAN, or Wi-Fi®, that connects to the wireless modules 310 of neighboring motes 104. Said motes 104 in turn connect to other motes 104, creating a network of low-power wireless connections that allows information from any point in the data center to reach the control module 106. The mesh network may have self-healing and auto-discovery features, allowing motes 104 to be added and removed without disrupting communications or needing substantial operator oversight.

As noted above, the motes 104 may organize into a mesh network. A mesh network is a multi-hop network where each mote 104 can be both a source and a relay communication node. This characteristic allows for a mesh network topology, as opposed to a star topology (single-hop network) where each mote would have to be able to talk directly to the gateway or control module 106. A wireless module 310 in such a network would need to be more powerful and it would therefore be advantageous to power it from a power source other than batteries. The mesh network can use a time-synchronized communication protocol so the motes 104 will be able to sleep most of the time and wake up only on predetermined time slots, thus reducing power consumption and avoiding communication collisions and retransmissions. In a time-synchronized protocol, the motes have their clocks synchronized. Such clocks can be used for Time of Flight measurements, improving the localization resolution. The control module 106 has full information of the mesh network and defines and optimizes the routing paths.

The mote 104 may be integrated with its respective rack 102 and may draw power from the rack's power system or may be battery powered. Alternatively, the mote 104 may be a module added after installation. The mote 104 may further include control logic 312 that allows the mote 104 to issue commands to devices within the rack. For example, the control logic 312 may use asset module 306 to signal an individual asset tag 204. This signal may trigger the asset tag 204 to, for example, display an indicator, provide its identifier, change its identifier, etc. Control logic 312 may further process and relay commands from control module 106, allowing the mote 104 to control such functions in the rack 102 as cooling, power management, etc.

Figure 4:
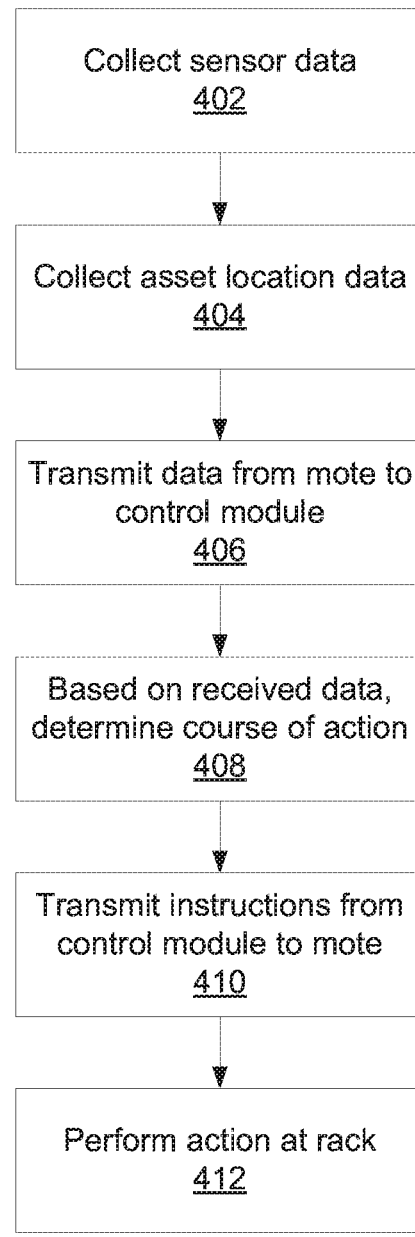
FIG. 4 is a block/flow diagram of a method for data center management in accordance with the present principles.

Referring now to FIG. 4, a method for data center management is shown. At block 402, a mote 104 collects various sensor data. As described above, this sensor data may include temperature data, power usage data, humidity data, air flow data, and corrosion data. Block 404 collects asset location data. This may be performed by polling asset tags 204 or by receiving broadcast identification information from said tags 204.

Block 406 transmits the collected data from the mote 104 to a control module 106. This transmission may be over a wired or wireless connection. In particular, it is contemplated that the motes 104 form a wireless mesh network that is in communication with the control module 106. To transmit data to the control module 106, the mote 104 in question uses low-power wireless communications to transmit to a nearby mote 104 in a different rack 102. The nearby mote 104 in turn transmits the data to another mote 104, until the data reaches the control module 106.

Block 408 makes a determination at the control module 106 based on the data received from mote 104. One example of such a determination might include comparing the temperature to a threshold temperature. If the present temperature in a rack 102 exceeds a threshold temperature, the control module 106 may increase cooling in the rack 102. Similarly, if the power draw in the rack 102 is too high, the control module 106 may act to decrease the power usage.

Block 410 transmits instructions from the control module 106 back to the mote 104 through the mesh network. Upon receiving the instructions, the mote 104 performs the action at block 412. Such an action might be the illumination of an indicator at an asset tag 204, the increase or decrease of cooling within the rack, etc. This allows data center operators to more effectively manage the data center's resources and allows for a degree of automation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
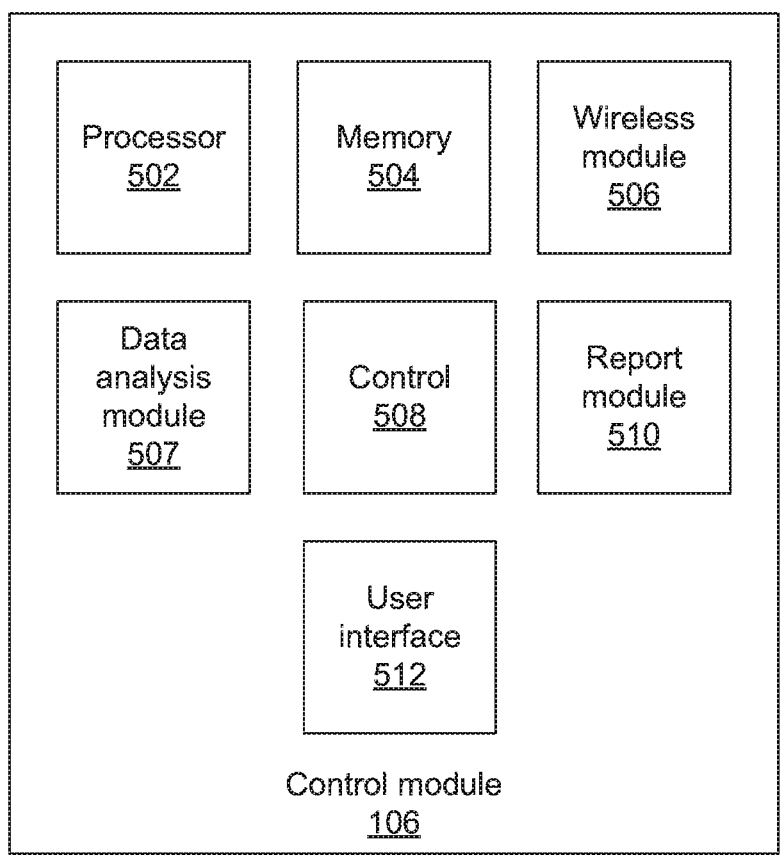
FIG. 5 is a diagram of a control module in accordance with the present principles.

Referring now to FIG. 5, a diagram of control module 106 is shown. The control module includes a processor 502 and a memory or database 504. A wireless module 506 receives sensor and asset data from one or more motes 104, either directly or through a wireless network. In one specifically contemplated embodiment, the wireless network is a mesh network. The wireless module 506 stores said data in memory 504.

A data analysis module 507 uses processor 502 to perform one or more types of analysis on the data. As described above, this analysis may be as simple as comparing a current temperature to a threshold, or may perform longitudinal statistical analysis of trends within the data center. One application for such statistics may be to identify equipment that operates at a consistently higher temperature, perhaps due to high server load. Equipment that operates at a high temperature will need more frequent maintenance. This allows the data center to take preventative action by, e.g., weighing the costs of increasing the cooling to a rack against the benefits of greater hardware longevity. Control logic 508 uses these statistical analyses to determine a course of action and sends instructions to a mote 104 via wireless module 506.

The control module 106 also includes a report module 510 that periodically generates and displays reports regarding the data center's status to an operator. Such a report may include graphs showing sensor information over time and may further include an interactive map of the data center that shows where every asset can be located. The report module 510 works in conjunction with a user interface 512, which displays the reports and allows a data center operator to enter instructions. For example, the operator may select a malfunctioning asset 202 within a displayed rack 102 and instruct the associated asset tag 204 to provide a visual or audio indicator that allows a technician to quickly locate the asset 202.

Having described preferred embodiments of a system and method for improved data center management (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A data center management system, comprising:
a control module configured to monitor an operating status of a data center; and
a plurality of racks, located in the data center, each having one or more assets and an integrated communication mote integrated within the racks in the data center that is configured to collect sensor data and asset location data and to transmit said collected data to the control module over a mesh network, wherein the integrated communication mote comprises:
sensors configured to monitor environmental variables at the respective racks in the data center, said environmental variables including light intensity, temperature, pressure, air flow, vibrations, audio and imagery;
an asset module configured to determine a location and identification information for each asset in the racks in the data center, to communicate with one or more asset tags associated with the assets in the respective racks in the data center, and to activate a visual or audio indicator in the one or more asset tags; and
a communication module configured to communicate said sensor data and asset location data and to relay an instruction received from the control module to a component within each rack in the data center, the instruction including a command to the component to perform one or more actions at the racks in the data center, to associate wirelessly with one or more neighboring motes to form the mesh network, to transmit collected sensor data and asset location data to a neighboring mote, and to retransmit sensor data and asset location data received from a neighboring mote to other neighboring motes, wherein each asset module is further configured to activate the visual or audio indicator on a respective asset tag upon receipt of the command and the actions comprise an illumination of an indicator at an asset tag and an increase or decrease of cooling within the each rack in the data center.

2. The data center management system of claim 1, wherein each asset module is configured to communicate with one or more asset tags associated with the assets in the respective rack.

3. The data center management system of claim 2, wherein the asset tags comprise a radio frequency identification transmitter that transmits an identifier to the respective integrated communication mote.

4. The data center management system of claim 1, wherein the integrated communication mote further comprises a pollutant detecting sensor configured to detect pollutants at the respective rack and a power sensor configured to monitor power consumption at the respective rack.

5. The data center management system of claim 1, wherein each rack further comprises a managed service unit configured to provide a service to the assets in the rack and wherein said managed service unit is controlled by the integrated communication mote in response to receipt of the command from the control module.

6. The data center management system of claim 5, wherein the service to the assets in the rack includes increasing power to a cooling unit when a temperature in the respective rack is exceeded.

7. The data center management system of claim 5, wherein the service to the assets in the rack includes power management of the one or more assets.

8. The data center management system of claim 1, wherein each of the integrated communication motes are a node in the mesh network.

9. The data center management system of claim 1, wherein the mesh network uses a time-synchronized protocol.

10. A managed rack, located in a data center comprising:
one or more assets, located in the data center, each having an associated asset tag;
sensors configured to collect environmental data at the rack in the data center, said environmental data including light intensity, temperature, pressure, air flow, vibrations, audio and imagery; and
an integrated communication mote integrated within the rack in the data center, comprising:
a receiver configured to receive the environmental data collected from the sensors;
an asset module configured to determine a location and identification information for each asset in the rack in the data center using the assets' associated asset tags, to communicate with the asset tags in the rack in the data center, and to activate a visual or audio indicator in the asset tags; and
a communication module configured to communicate, over a mesh network, said sensor data and asset location data to a control module and to relay an instruction received from the control module to a component within the rack in the data center, the instruction including a command to the component to perform one or more actions at the rack in the center, data to associate wirelessly with one or more neighboring motes to form the mesh network, to transmit collected sensor data and asset location data to a neighboring mote, and to retransmit sensor data and asset location data received from a neighboring mote to other neighboring motes, wherein the asset module is further configured to activate the visual or audio indicator on a respective asset tag upon receipt of the command and the actions comprise an illumination of an indicator at an asset tag and an increase or decrease of cooling within the each rack in the data center.

11. The managed rack of claim 10, wherein the rack further comprises a managed service unit configured to provide a service to the assets in the rack and wherein said managed service unit is controlled by the integrated communication mote in response to receipt of the command from the control module.

12. The managed rack of claim 11, wherein the service to the assets in the rack includes power management of the one or more assets.

13. The managed rack of claim 11, wherein the service to the assets in the rack includes increasing power to a cooling unit when a temperature in the respective rack is exceeded.

14. The managed rack of claim 10, wherein the integrated communication mote further comprises a power sensor configured to monitor power consumption at the respective rack.

15. The managed rack of claim 10, wherein the integrated communication mote is a node in the mesh network.

16. The managed rack of claim 10, wherein the mesh network uses a time-synchronized protocol.

17. A data center management system, comprising:
a control module configured to monitor an operating status of a data center; and
a plurality of racks, located in the data center, each having one or more assets, a managed service unit, and an integrated communication mote integrated within the rack in the data center that is configured to collect sensor data and asset location data and to transmit said collected data to the control module, wherein the integrated communication mote comprises:
sensors configured to monitor environmental variables at the respective rack in the data center, the environmental variables including light intensity, temperature, pressure, air flow, vibrations, audio and imagery;
an asset module configured to determine a location and identification information for each asset in the rack, to communicate with one or more wireless asset tags associated with the assets in the respective rack in the data center, and to activate a visual or audio indicator in the one or more wireless asset tags;
a communication module configured to communicate said sensor data and asset location data and to relay an instruction received from the control module to a component within each rack in the data center, the instruction including a command to the component to perform one or more actions at the rack, to associate wirelessly with one or more neighboring motes to form a mesh network, to transmit collected sensor data and asset location data to a neighboring mote, and to retransmit the sensor data and asset location data received from a neighboring mote to other neighboring motes, wherein each asset module is further configured to activate the visual or audio indicator on a respective asset tag upon receipt of the command, wherein the managed service unit is configured to provide a service to the assets in the rack, located in the data center, and wherein said managed service unit is controlled by the integrated communication mote in response to receipt of the command from the control module and the actions comprise an illumination of an indicator at an asset tag and an increase or decrease of cooling within the each rack in the data center.

18. The managed rack of claim 10, wherein the asset tags comprise a radio frequency identification transmitter that transmits an identifier to the integrated communication mote.

19. The managed rack of claim 10, wherein the integrated communication mote further comprises a pollutant detecting sensor configured to detect pollutants at the respective rack.

20. The data center management system of claim 18, wherein the integrated communication mote further comprises a pollutant detecting sensor configured to detect pollutants at the respective rack and a power sensor configured to monitor power consumption at the respective rack.

* * * * *